US011895720B2

(12) United States Patent
Virtej et al.

(10) Patent No.: US 11,895,720 B2
(45) Date of Patent: Feb. 6, 2024

(54) CONTROL MECHANISM FOR SUPPORTING CONNECTION ESTABLISHMENT PROCEDURE

(71) Applicant: NOKIA TECHNOLOGIES OY, Espoo (FI)

(72) Inventors: Elena Virtej, Espoo (FI); Tero Henttonen, Espoo (FI); Jarkko Tuomo Koskela, Oulu (FI); Lars Dalsgaard, Oulu (FI)

(73) Assignee: Nokia Technologies OY, Espoo (FI)

( * ) Notice: Subject to any disclaimer, the term of this patent is extended or adjusted under 35 U.S.C. 154(b) by 380 days.

(21) Appl. No.: 17/428,060

(22) PCT Filed: Feb. 14, 2019

(86) PCT No.: PCT/EP2019/053701
§ 371 (c)(1),
(2) Date: Aug. 3, 2021

(87) PCT Pub. No.: WO2020/164714
PCT Pub. Date: Aug. 20, 2020

(65) Prior Publication Data
US 2022/0151000 A1 May 12, 2022

(51) Int. Cl.
*H04W 76/15* (2018.01)
*H04L 5/00* (2006.01)
(Continued)

(52) U.S. Cl.
CPC .......... *H04W 76/15* (2018.02); *H04L 5/0051* (2013.01); *H04W 24/10* (2013.01); *H04W 74/0833* (2013.01)

(58) Field of Classification Search
None
See application file for complete search history.

(56) References Cited

U.S. PATENT DOCUMENTS

2020/0195398 A1\* 6/2020 Futaki .................. H04L 5/0039
2020/0229058 A1\* 7/2020 Park ................ H04W 36/00835
(Continued)

OTHER PUBLICATIONS

International Search Report and Written Opinion dated Oct. 10, 2019 corresponding to International Patent Application No. PCT/EP2019/053701.
(Continued)

*Primary Examiner* — Walter J Divito
(74) *Attorney, Agent, or Firm* — Lippes Mathias LLP

(57) ABSTRACT

An apparatus for use by a communication network control element or function configured to conduct a communication control for a communication with a communication element or function in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to prepare the communication element or function to conduct measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection, to receive and process a random access related signaling from the communication element or function regarding the primary connection, to determine a timing for initiating a transmission of the reference signal by the at least one secondary communication network control element or function, and to cause transmission of the reference signal by the at least one secondary communication network control element or function on the basis of the determined timing.

20 Claims, 9 Drawing Sheets

(51) Int. Cl.
*H04W 24/10* (2009.01)
*H04W 74/08* (2009.01)

(56) References Cited

U.S. PATENT DOCUMENTS

2022/0030660 A1* 1/2022 Yi .......................... H04W 72/23
2022/0353940 A1* 11/2022 Cirik ..................... H04B 7/088

OTHER PUBLICATIONS

Nokia et al., "Solutions for wider bandwidth options," 3GPP Draft, R1-1703193, 3GPP TSG-RAN WG1 Meeting #88, Athens, Greece, Feb. 12, 2017, XP051210327.
Nokia et al., "Finalizing IDLE mode measurements for euCA," 3GPP Draft, R2-1806772, 3GPP TSG-RAN WG2 Meeting #102, Busan, South Korea, May 25, 2018, XP051465117.

* cited by examiner

CONTROL MECHANISM FOR SUPPORTING CONNECTION ESTABLISHMENT PROCEDURE

BACKGROUND

Field

Examples of embodiments relate to apparatuses, methods, systems, computer programs, computer program products and (non-transitory) computer-readable media usable for conducting a control in connection establishment access procedure in a communication network, and in particular to apparatuses, methods, systems, computer programs, computer program products and (non-transitory) computer-readable media usable for assisting a reference signal configuration and improving reporting of measurements by a user equipment, in particular in connection with dual/multi connectivity and carrier aggregation scenarios.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partnership Project
4G fourth generation
5G fifth generation
BS base station
CA carrier aggregation
CC component carriers
CN core network
CPU central processing unit
CSI-RS channel state information reference signal
DC dual connectivity
DCCA dual connectivity carrier aggregation
DL downlink
eNB evolved node B
ETSI European Telecommunications Standards Institute
gNB next generation node B
LTE Long Term Evolution
LTE-A LTE Advanced
MAC medium access control
MC multi connectivity
Msg message
NG new generation
NR new radio
NW network
Pcell primary cell
PDCCH physical downlink control channel
PRACH physical random access channel
PSC primary serving cell
RA random access
RACH random access channel
RAR random access response
RLC radio link control
RRC radio resource control
Scell secondary cell
SSB synchronization signal block
SSC secondary serving cell
SSS secondary synchronization signal
UE user equipment
UL uplink
UMTS universal mobile telecommunication system

SUMMARY

According to an example of an embodiment, there is provided, for example, an apparatus for use by a communication network control element or function configured to conduct a communication control for a communication with a communication element or function in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to prepare the communication element or function to conduct measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection, to receive and process a random access related signaling from the communication element or function regarding the primary connection, to determine a timing for initiating a transmission of the reference signal by the at least one secondary communication network control element or function, and to cause transmission of the reference signal by the at least one secondary communication network control element or function on the basis of the determined timing.

Furthermore, according to an example of an embodiment, there is provided, for example, a method for use in a communication network control element or function configured to conduct a communication control for a communication with a communication element or function in a communication network, the method comprising preparing the communication element or function to conduct measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection, receiving and processing a random access related signaling from the communication element or function regarding the primary connection, determining a timing for initiating a transmission of the reference signal by the at least one secondary communication network control element or function, and causing transmission of the reference signal by the at least one secondary communication network control element or function on the basis of the determined timing.

According to further refinements, these examples may include one or more of the following features:
the communication element or function may be prepared to conduct the measurements for establishing the secondary connection during the random access procedure conducted for establishing a primary connection in future by providing at least one of an indication to store, in the communication element or function, data of configured reference signals used during a connected state of the communication element or function, and configuration data of at least one reference signal of at least one secondary communication network control element or function enabling the establishment of the secondary connection, the configuration data indicating at least one of communication resources to be listened by the communication element or function for receiving the reference signal and timing information regarding a reception of the reference signal, or the communication element or function may be prepared to conduct the measurements for establishing the secondary connection during the random access procedure conducted for establishing a current primary connection by providing an indication of at least one reference signal in a random access related signaling;

a transmission of the configuration data may be caused with a connection release message to the communication element or function in a communication connection existing before the establishment of the primary connection in future;

the timing for initiating the transmission of the reference signal by the at least one secondary communication network control element or function may comprise one of initiating the transmission of the reference signal by the at least one secondary communication network control element or function after receiving a preamble in the random access related signaling from the communication element or function, initiating the transmission of the reference signal by the at least one secondary communication network control element or function after transmitting, to the communication element or function, a random access response message in reply to a random access preamble in the random access related signaling from the communication element or function, and initiating the transmission of the reference signal by the at least one secondary communication network control element or function after receiving a connection request message from the communication element or function;

determining of the timing for initiating the transmission of the reference signal by the at least one secondary communication network control element or function may comprise setting a period of time during which the reference signal is to be transmitted by the at least one secondary communication network control element or function;

a beam correspondence for a transmission of the reference signal by the at least one secondary communication network control element or function may be determined on the basis of a beam used for communicating a random access related signaling, and transmission of the reference signal by the at least one secondary communication network control element or function may be caused on the basis of the determined beam correspondence;

during the random access procedure conducted for establishing the primary connection, measurement results regarding the secondary connection may be received from the communication element or function and processed after completion of security setting for the communication connection between the communication element or function and the communication network control element or function in the random access procedure;

the secondary connection may be established in a dual connectivity mode communication or carrier aggregation mode communication of the communication element or function;

the reference signal to be transmitted by the at least one secondary communication network control element or function may be a channel state information reference signal;

the processing may be implemented in a communication network control element or function acting as the communication network control element or function for the primary connection and as the secondary communication network control element or function;

in case the processing is implemented in a communication network control element or function acting as the communication network control element or function for the primary connection and the secondary communication network control element or function is located in a different site and controlled by the communication network control element or function for the primary connection, transmission of the reference signal by the at least one secondary communication network control element or function may be caused by sending an instruction to the at least one secondary communication network control element or function.

According to an example of an embodiment, there is provided, for example, an apparatus for use by a communication element or function configured to conduct a communication in a communication network under control of a communication network control element or function, the apparatus comprising at least one processing circuitry, and at least one memory for storing instructions to be executed by the processing circuitry, wherein the at least one memory and the instructions are configured to, with the at least one processing circuitry, cause the apparatus at least: to obtain information for conducting measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection, to start a random access procedure for establishing the primary connection with the communication network control element or function by sending a random access related signaling to the communication network control element or function, to determine a timing for receiving the reference signal from the at least one secondary communication network control element or function on the basis of the obtained information, and to listen to the reference signal transmitted by the at least one secondary communication network control element or function on the basis of the determined timing.

Furthermore, according to an example of an embodiment, there is provided, for example, a method for use in a communication element or function configured to conduct a communication in a communication network under control of a communication network control element or function, the method comprising obtaining information for conducting measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection, starting a random access procedure for establishing the primary connection with the communication network control element or function by sending a random access related signaling to the communication network control element or function, determining a timing for receiving the reference signal from the at least one secondary communication network control element or function on the basis of the obtained information, and listening to the reference signal transmitted by the at least one secondary communication network control element or function on the basis of the determined timing.

According to further refinements, these examples may include one or more of the following features:

- the information for conducting the measurements for establishing the secondary connection may be obtained during the random access procedure conducted for establishing a primary connection in future by one of storing data of configured reference signals used during a connected state of the communication element or function, and receiving and processing configuration data from the communication network control element or function indicating at least one reference signal of at least one secondary communication network control element or function enabling the establishment of the secondary connection, the configuration data indicating at least one of communication resources to be listened by the communication element or function for receiving the reference signal and timing information regarding a reception of the reference signal, or the information for conducting the measurements for establishing the secondary connection may be obtained during the random access procedure conducted for establishing a current primary connection by receiving an indication of at least one reference signal in a random access related signaling;
- the configuration data may be received with a connection release message from the communication network control element or function in a communication connection existing before the establishment of the primary connection in future;
- the timing for receiving the reference signal from the at least one secondary communication network control element or function may comprise one of starting to listen to the reference signal from the at least one secondary communication network control element or function after transmitting a preamble in the random access related signaling to the communication network control element or function, starting to listen to the reference signal from the at least one secondary communication network control element or function after receiving from the communication network control element or function a random access response message in reply to a random access preamble in the random access related signaling, and starting to listen to the reference signal from the at least one secondary communication network control element or function after transmitting a connection request message to the communication network control element or function;
- determining of the timing for receiving the reference signal from the at least one secondary communication network control element or function may comprise setting a period of time during which the reference signal is to be transmitted by the at least one secondary communication network control element or function;
- a beam via which the reference signal from the at least one secondary communication network control element or function is received may be determined on the basis of a beam used for communicating a random access related signaling, and the reference signal from the at least one secondary communication network control element or function may be listened to on the basis of the determined beam;
- during the random access procedure conducted for establishing the primary connection, transmission of measurement results regarding the secondary connection to the communication network control element or function may be caused after completion of security setting for the communication connection between the communication element or function and the communication network control element or function in the random access procedure;
- the secondary connection may be established in a dual connectivity mode communication or carrier aggregation mode communication of the communication element or function;
- the reference signal to be received from the at least one secondary communication network control element or function may be a channel state information reference signal;
- the communication network control element or function may act as the communication network control element or function for the primary connection and as the secondary communication network control element or function;
- the communication network control element or function may act as the communication network control element or function for the primary connection and the secondary communication network control element or function may be located in a different site and controlled by the communication network control element or function for the primary connection.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
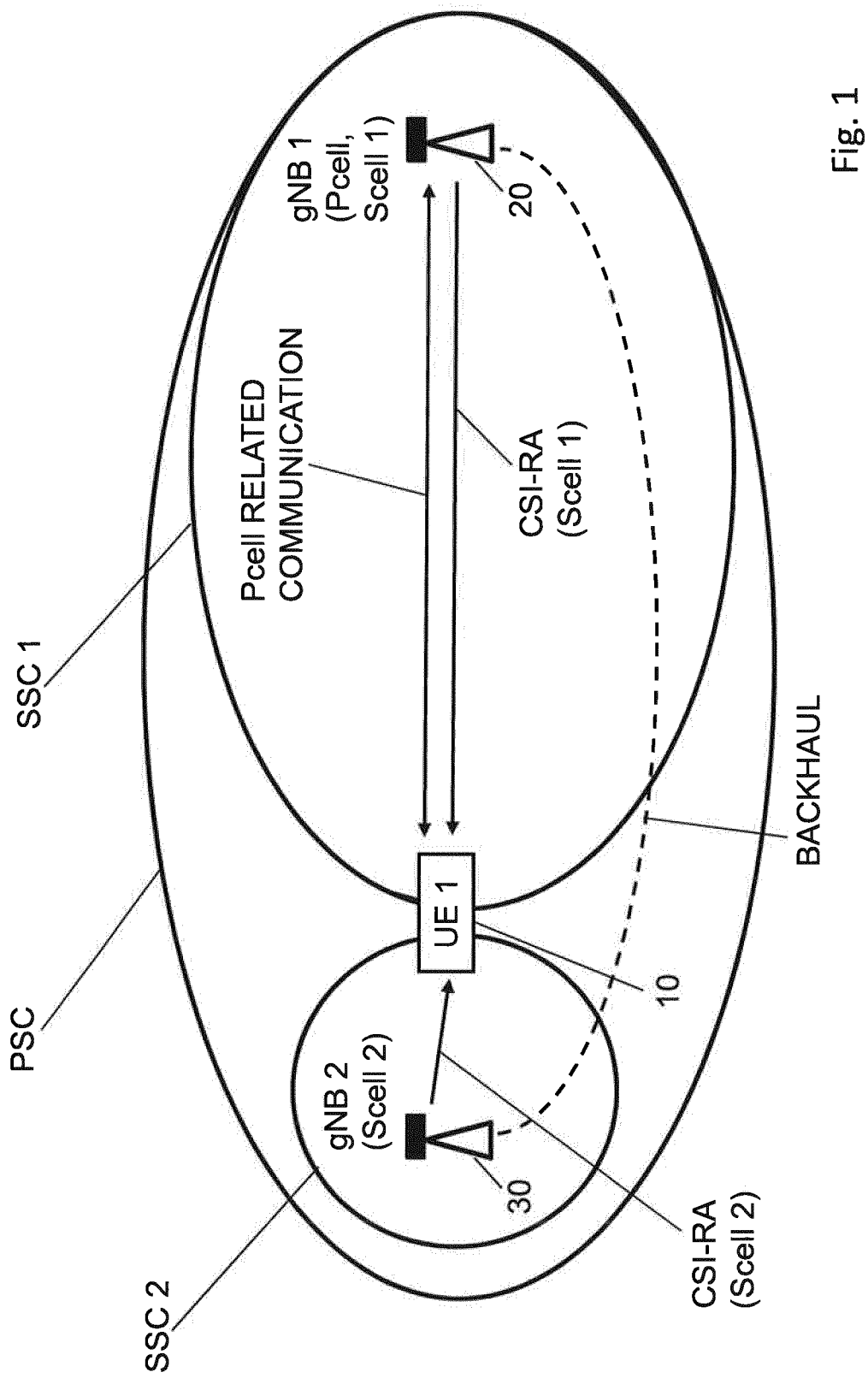
FIG. 1 shows a diagram illustrating an example of a communication network environment in which examples of embodiments are implementable.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more end points (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

In communication networks, in particular mobile communication systems, it is desired to increase the bandwidth and the like in order to improve the network performance. As possible approaches to achieve this goal, carrier aggregation (CA) and multi/dual connectivity (MC/DC, in the following reference is made to DC) are proposed, for example. CA is introduced in in order to allow a communication element or function, such as a UE, to simultaneous transmit and receive data on multiple component carriers from a single base station, such as an eNB or gNB. By means of CA, user throughput can be increased since the aggregated bandwidth is increased. A contiguous or non-contiguous CA can be implemented, wherein the latter allows for more efficiently utilization of fragmented frequency resources. Furthermore, a multiplexing gain by dynamically distributing traffic over multiple carriers can be achieved.

On the other hand, DC is introduced in order to allow a UE to simultaneously be connected to two cell groups (i.e. master cell group (MCG) and secondary cell group (SCG)) (or more in case of MC). The two cell groups may be controlled by different nodes (e.g. by different gNBs). By using DC, it is possible to increase user throughput, provide mobility robustness, and support load-balancing among base stations.

In current and upcoming communication networks, such as communication networks based on 3GPP Release 15, different DC approaches are implemented, such as EUTRA-NR DC, standalone NR operation, NR-EUTRA DC as well as NR-NR DC. In the standalone NR operation, the UE accesses standalone NR carrier and may not be connected to another type of carrier, such as an LTE carrier. In a non standalone NR solution (i.e. DC of LTE and NR, for example), the UE may access an LTE PCell and is then configured by dual connectivity to also operate on NR, or vice versa. Configuration in which the UE is simultaneously connected to LTE and NR, or to LTE for control plane and NR for user plane are conceivable.

In addition to DC, multiple carriers have been a key feature for boosting peak data rates in flexible manner for many different deployment scenarios. However, the CA framework is based on tight network coordination and availability of UE assistance information via UE measurement reporting.

It is known that in current CA framework configurations, like in LTE, setup delay for both PCell and configured Scell may take from 30 ms to 1s. Similar setup times can be assumed for DC scenarios. This delay limits, however, the utilization of spectrum as the UE may have left connected mode already when CA/DC is setup.

For NR, cell access has been based on similar principles as LTE. One new key element NR is bringing is enabling the possibility of utilizing much larger spectrum bandwidths, ultimately leading to ~10 times higher peak data rates than LTE. Delays in accessing the high capacity (small) cells are detrimental to the performance and in NR this can be even more pronounced (e.g. especially if the macro cell is LTE based). Thus, to fully take advantage on the large bandwidth possibilities, an efficient and fast utilization of the large bandwidth should be ensured in all cases, including initial connection establishment, reconfiguration of CA/DC and addition of secondary cells.

One way to achieve this is to provide measures allowing an early measurement reporting on Scells. That is, an early and fast reporting of measurement information availability from neighbor and serving cells helps to reduce a delay in setting up DC and/or CA based communication connections, e.g. for procedures when the UE is in IDLE or INACTIVE mode.

It is proposed to employ, for example in LTE, an enhanced utilization of CA, also referred to as euCA LTE. In short, euCA's main principle/scope is to shorten the CA setup delay and enabling fast offloading to small cells, especially for an UE transitioning from IDLE state to CONNECTED state at traffic arrival (mobile originated or mobile terminated traffic).

It has been found out that a major bottleneck of CA/DC in an inter-frequency inter-site scenario are the inter-frequency measurements. Therefore, it is specified that an UE can be configured by the network (e.g. the serving eNB) with a list of carriers on which the UE can perform additional IDLE mode measurements. At traffic arrival, the UE can indicate these to the eNB (if eNB indicates so) and therefore the eNB is able to accelerate the configuration of the SCell(s) in small cell layer used for offloading purposes.

Based on this, the following settings are used in euCA procedures.

The UE can be indicated a configuration that causes the UE to measure one or more indicated carriers (e.g. inter-frequency or inter-RA carriers) to measure during the idle state, wherein the indication for which carrier(s) the UE could do the IDLE measurements may be included in System Information Block x (for example, if x=5, it would be System Information Block Type 5 (SIB5)) and dedicated RRC signaling (including a validity timer, controlling how long UE does the measurements). The UE indicates the availability of inter-frequency measurements in specific UL signaling to the network, e.g. in a RRCConnectionSetupComplete or RRCConnectionResumeComplete message.

Furthermore, the UE can be provided with a "candidate cell measurement configuration" within a downlink specified signaling, e.g. in an RRCConnectionRelease message, that is different from the SIBx configuration. In this case, this overrides any SIBx configurations. It is to be noted that a validity timer is only defined for configurations given in a downlink message (e.g. RRCConnectionRelease).

Moreover, the UE may continue performing the IDLE state measurements after a cell reselection.

Otherwise, in case the ongoing IDLE state measurement is configured only via SIBx in the source cell, after a cell reselection, if the SIB5 of the target cell includes the IDLE state measurement configuration, the UE continues performing IDLE state measurement and updates the configuration according to the SIBx of the target cell.

After cell reselection, if the SIBx of the target cell includes no configuration for the IDLE state measurement, the UE stops performing IDLE state measurement.

For reporting the IDLE mode measurements, the following is set: the UE waits for an explicit eNB-request for the IDLE mode measurements. The measurements could be reported e.g. after security establishment. A timer, for example timer T331, may start upon downlink message (e.g. RRC Connection release message) containing the timer configuration is received by the UE.

It is to be noted that a minimum SCell signal quality threshold for reporting may be configured by the eNB.

As described above, one possible way for achieving an efficient and fast utilization of available resources and to accelerate an initial connection establishment is to arrange for an early measurement reporting on Scells.

While euCA is available for LTE based system, an simple application thereof in NR is not possible, for different reasons. For example, one key element that Rel-15 LTE euCA relies on for early measurements approach (i.e. extra IDLE mode measurements) is the always-on reference signals (CRS), which is provided in LTE based systems. However, in NR based systems, such always-on reference signals are not provided. Instead, reference signals are periodic (e.g. every 20 ms, 40 ms, etc).

This implies that the UE would be able to perform IDLE/INACTIVE mode measurements only in some specific times. Consequently, a permanent measurement of RS at all times is not optimal; for example, as long as the RS is not transmitted, power waste at the UE side would be caused.

Currently, mobility IDLE/INACTIVE mode measurements in NR are based on SSBs (also in the case of inter-frequency measurements), specifically at least on NR-SSS (used for DL based RRM measurement for L3 mobility in IDLE mode).

On the other hand, for CONNECTED mode, the measurements for intra-frequency and inter-frequency cases are based on SSB and/or the CSI-RS. However, there is a problem in that these signals are also on-off reference signals. For example, the CSI-RS is transmitted per beam. Each SSB has CSI-RS (CSI-RS is UE specifically configured).

Consequently, it is desirable to improve an utilization of available resources and to accelerate an initial connection establishment, in particular in case of MC/DC and or CA, by shortening a delay for the UE to find reference signals for measurements, while an extra power consumption e.g. due to waiting for a certain periodicity is avoided. Specifically, measures allowing an early reporting of measurements in order to shorten e.g. the CA activation delay, such as in an inter-frequency inter-site scenario, but also in other scenarios, is desirable.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks where an early measurement reporting is desirable and which have suitable means by adjusting parameters and procedures appropriately, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc . . . . Furthermore, without loss of generality, the description of some examples of embodiments is related to a mobile communication network, but principles of the invention can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

FIG. 1 shows a diagram illustrating an example of a communication network environment in which examples of embodiments are implementable.

Specifically, in FIG. 1, a UE 10 as an example of a communication element or function is located in a communication area of a communication network where a plurality of access possibilities allows to establish a DC/MC connection. Furthermore, the network and the UE 10 are adapted to establish a CA based communication, for example.

In the example shown in FIG. 1, a first communication network control element or function, e.g. a gNB 20 controls a first communication area or cell which acts in the following as a PSC. Furthermore, gNB 20 controls also other cells, which act as a SSC (also referred to as SSC 1) in the following. Differences in cell configurations, such as coverage area sizes, of the gNB 20 controlled cells are caused, for example, by differing frequencies or the like.

In addition, in the network deployment according to FIG. 1, a second communication network control element or function, i.e. gNB 30 is provided which controls an own communication area or cell. In the following, the cell controlled by the gNB 30 acts as another SSC (also referred to as SSC 2).

That is, in the following, it is assumed that gNB 20 controls the Pcell and also (at least) one Scell 1, while gNB 30 controls another Scell 2. DC communication of UE 10 can be established in differing scenarios, for example with Pcell and Scell 1, or Pcell and Scell 2. SCell 1 may be in the same location with PCell as depicted in the figure, or it may be in different location (in the case of inter-site CA). Or alternatively, the gNB 1 may control also SCell2 (in the inter-site CA deployment).

Furthermore, in FIG. 1, a backhaul connection (e.g. an X2 or Xn interface) between the communication network control areas or functions involved in the communication connection of the UE 10 is provided. The backhaul connection is used, for example, for exchanging data and instructions between the gNB 20 (acting also as a master node) and the gNB 30 (acting as a secondary node).

Also shown in FIG. 1 are signaling paths between the gNBs 20 and 30 and the UE which are of relevance for understanding the basic principles of embodiments of the invention. In detail, a Pcell related communication signaling between the gNB 20 (acting as the Pcell controller) and the UE 10 is depicted, wherein signaling related, for example, to a random access procedure or RRC signaling is exchanged. Furthermore, signaling paths between the gNB 20 (acting as the Scell 1 controller) and the UE 10 as well as between the gNB 30 (acting as the Scell 2 controller) and the UE 10 are shown. The main purpose of these signaling paths is the transmission of a reference signal (such as CSI-RS) to the UE 10 allowing a measurement reporting towards the Pcell gNB 20 concerning the Scells being available for the UE 10.

Next, measures according to examples of embodiments are summarized which allow to achieve an early measurement reporting in a communication scenario like that shown in FIG. 1. In detail, the measures described in the following are related to a network assisted reference signal configuration assisting the early UE measurement reporting.

As a first measure, the UE 10 prepared by the network to conduct a measurement of the reference signals provided by Scells during a phase when the UE 10 (re-)connects to the network, i.e. the Pcell, when being in an idle or inactive state, for example. For this, a reference signal pattern (also referred to as CSI-RS pattern) is provided to the UE 10.

According to one approach, the UE 10 is (pre-)configured at a connection release of a previous connection (with Scell and/or Pcell) by sending the CSI-RS pattern for (possible or all) Scell(s) which can be used for UE measurements when establishing the next connection. That is, information related to a future connection establishment are provided to the UE when releasing a (previous) connection.

According to another approach, the UE 10 is indicated, e.g. during the establishment of the connection with an Scell, or by a preconfigured setting in the UE 10 or otherwise when in connected state, to store any configured CSI-RS used in a connected mode (i.e. during a previous connection), wherein the stored data are then used in a future connection establishment phase.

Furthermore, according to another approach, CSI-RS pattern information are provided by the network to the UE 10 when the connection establishment procedure to the Pcell is in progress. That is, the preparation of the UE 10 in this case concerns the provision of information related to the current connection establishment phase.

According to examples of embodiments, the CSI-RS pattern includes information concerning resources to be listened for the CSI-RS, and the like.

When the reference signal related information are obtained in the UE 10 (e.g. by received signaling or by storing corresponding information), the Scell(s) is(are) initiated to transmit the pre-configured or stored CSI-RS. For this purpose, a timing for the transmission by the Scell is determined on the basis of different alternatives.

In one alternative, the Scell(s) initiate the transmission of the pre-configured or stored CSI-RS, once the Pcell receives a first signaling in the connection establishment procedure from the UE 10, for example RA preamble from UE 10.

In another alternative, Scell(s) starts transmitting the CSI-RS once the Pcell sends a first response to the UE 10, for example RAR.

In another alternative, the Scell(s) starts transmitting the CSI-RS after the Pcell has received a connection request from the UE 10, for example Msg3.

In each of the above mentioned alternatives, the Pcell controller instructs or triggers the Scell controller to start transmission of the CSI-RS at a predetermined timing. This timing is also determined on the UE 10 side so that the UE 10 knows when it has to listen to the Scell reference signal.

Furthermore, according to examples of embodiments, the network (i.e. the Scell) transmits the CSI-RS for a predetermined period of time. This predetermined period of time may be indicated to the UE beforehand, e.g. in connection with the reference signal pattern. Thus, the UE 10 can assume the pre-configured/stored CSI-RS being present during the predefined period of time. Alternatively, the CSI-RS can be assumed to be present until explicitly reconfigured by network (e.g. the Pcell controller).

It is to be noted that a benefit of initiating the CSI-RS transmission on Scells only after the network has received a signaling from the UE 10, for example PRACH preamble, is that the network has now knowledge of communication parameters usable for a communication with the UE 10, such as a beam correspondence. That is, the network can deduce on the basis of an analysis of the used communication path for the RA related signaling on which DL beam(s) the CSI-RS can be transmitted, wherein for example the DL beam used for PRACH signaling is used as a reference. This information is provided, for example, by the Pcell controller to the Scell controller which sends the CSI-RS on a corresponding beam to the UE 10.

Furthermore, according to some examples of embodiments, when the UE 10 is able to receive the CSI-RS, corresponding measurement results obtained from the received CSI-RS can be used for early reporting to the Pcell. For example, the reporting can be made by using signaling of the (ongoing) connection establishment to the Pcell (e.g. during the RA procedure and the related signaling), such as at a connection setup complete message (e.g. Msg5), or at a later point of time. This enables a faster Scell/CA utilization under control of the Pcell. Preferable, according to examples of embodiments. the measurement reporting is done by the UE 10 as soon as communication security between the UE 10 and the gNB 20 (as the Pcell controller) is achieved. For example, security may be resumed at Msg4 for a transition from inactive to connected state, so that Msg5 is a candidate for signaling the measurement results in NR.

As described above, one aspect of examples of embodiments is that the network (i.e. the Scell(s)) transmits the CSI-RS during the connection setup of the UE with the Pcell. Consequently, the UE 10 has additional reference signals available for early reporting, in addition to SSB RS.

Furthermore, examples of embodiments allow to have a dense CSI-RS configuration (even a specific pattern is possible) which is designed for fast and accurate measurement by the UE 10. Hence, the UE 10 can measure the Scells accurately and subsequently reply with a CSI-RS report fast. Moreover, it is to be noted that an overhead is very limited because the CSI-RS is transmitted only for a certain amount of time when the UE 10 is prepared to listen (i.e. according to the timing for the CSI-RS signaling), i.e. when the UE 10 is connecting to the network (e.g. when the RA preamble as part of an RA procedure is transmitted).

According to some examples of embodiments, the network is only expected to transmit the CSI-RS pattern when it receives a preamble (all or a specific group).

Moreover, according to some examples of embodiments, the network is configured to transmit the CSI-RS pattern during the PRACH procedure. Optionally, the CSI-RS pattern may be transmitted for a short period after the PRACH procedure.

In the following, examples for connection establishment control procedure according to examples of embodiments are described by referring to signaling diagrams according to FIGS. 2 to 5. It is to be noted that the examples shown in FIGS. 2 to 5 are related to a RA procedure of the UE 10 to the gNB 20 as the Pcell controller. The reference signal used for measuring the Scell(s) is assumed to be the CSI-RS.

It is to be noted that, basically, the RA procedure concerns, for example, an initial access from RRC_IDLE state, an RRC connection re-establishment procedure, a handover, DL or UL data arrival during RRC_CONNECTED when UL synchronization status is "non-synchronized", a transition from RRC_INACTIVE state, a beam failure recovery etc.

The RA procedure between a UE and the network (i.e. the serving gNB, for example) can be contention-based (e.g. when the UE is not yet synchronized or lost its synchronization), or contention-free (e.g. in case the UE was previously synchronized to another gNB). Both cases involve the transmission of a RA preamble from the UE to the gNB. The RA preamble is to be sent at specific time-frequency resources that are indicated by the gNB on the control channels by means of configuration information (e.g. broadcasted in the coverage areas of the respective gNBs).

In a the contention-based procedure (a contention-free case just requires the preamble transmission and the reception of the response thereto, on the UE side), in a first step, the NR UE randomly chooses a preamble from a predefined set and sends the preamble to the gNB, along with a temporary network identifier, which is computed based on the RA preamble as well or based at least on the RACH occasion where the RA preamble is transmitted. Then, the gNB responds to the request with a RA Response (RAR) message, which shall be received by the UE within a RA time window (RA-response Window) starting after the transmission of the last preamble symbol. In case the time window expires, the UE may attempt a new RA procedure. Otherwise, in case the RAR is received, in a next steps, the NR UE sends a scheduled transmission (referred to as Msg3 in an RA procedure), such as a RRC connection request, and is assigned a final network identifier. Due to the contention based RA procedure, the network checks for a possible contention case. If this is not the case, i.e. no contention is detected, contention resolution is indicated in a signaling to the UE. For this, the UE has started a contention resolution timer; when no contention resolution signaling is received from the network before this timer expires, contention is assumed, and the RA procedure is restarted. In case the UE receives a correct response, the RA procedure is deemed to be successful so that the UE is linked to the network.

Figure 2:
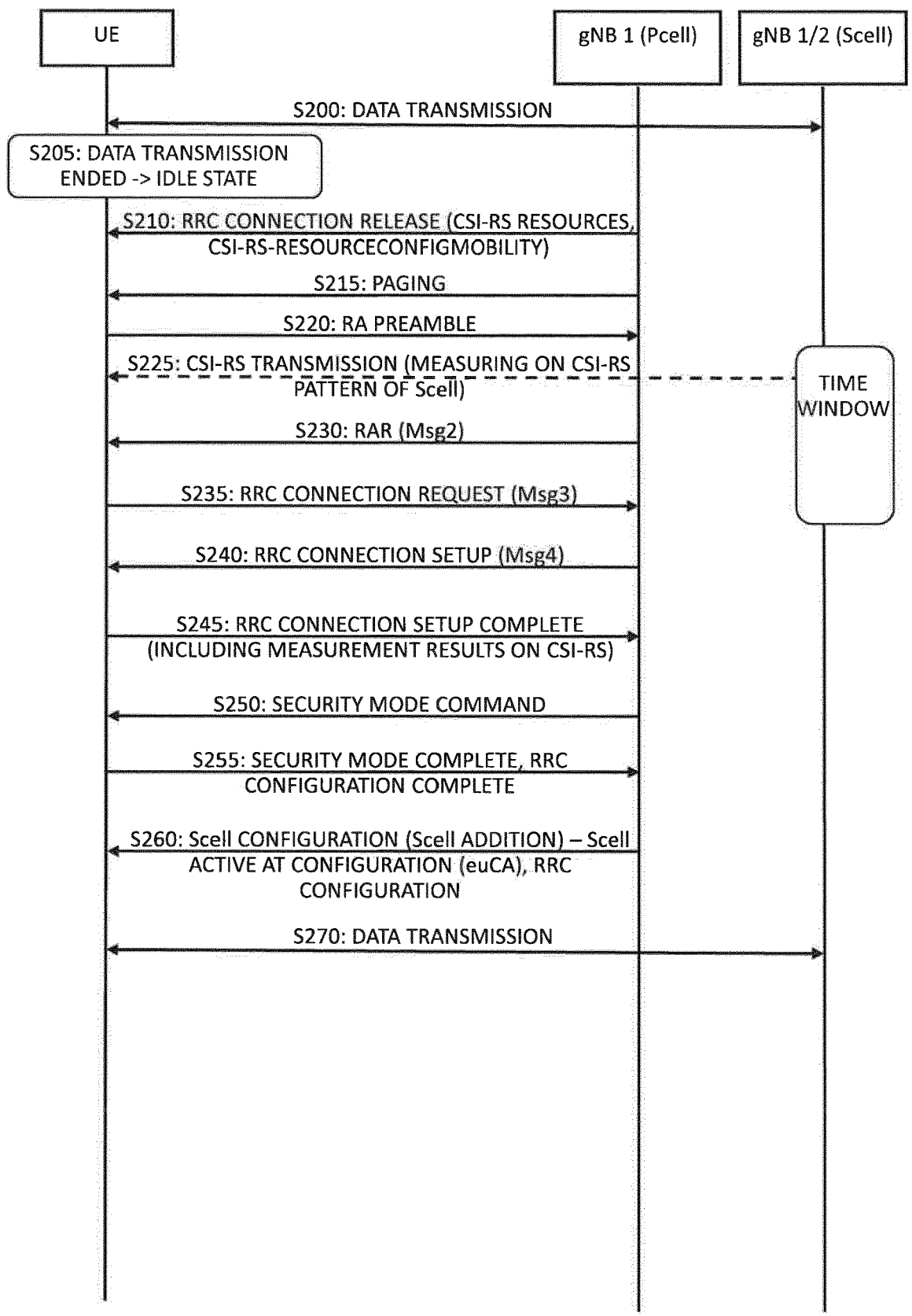
FIG. 2 shows a signaling diagram for explaining a connection establishment control procedure according to examples of embodiments.

FIG. 2 shows a signaling diagram for explaining a first example of a connection establishment control procedure according to examples of embodiments.

In S200, a data transmission is conducted between the UE 10 and the network, e.g. with the Scell in a DC connection (corresponds to the "previous connection" indicated above).

In S205, the data transmission is ended. Consequently, the UE 10 is set to transit from a connected state to, for example, an idle state.

In S210, the Pcell sends a connection release message to the UE 10.

According to the example of embodiments described in FIG. 2, at the connection release, the serving gNB (i.e. Pcell gNB 20) prepares the UE 10 for conducting the processing according to examples of embodiments by pre-configuring the UE 10 with a CSI-RS pattern, i.e. indicating on what resources the UE 10 can start measuring at a next (future) connection setup after sending an RA related signaling (e.g. after sending the RA preamble). For example, RRCConnectionRelease message contains a corresponding indication on resources used for the CSI-RS.

In S215, the network (Pcell) sends paging information, e.g. due to the arrival of data to be transmitted to the UE 10.

In S220, the UE 10 starts the connection establishment procedure, i.e. a RA procedure, by sending a RA preamble.

In the present example, CSI-RS transmission by the Scell is triggered when receiving the preamble from a UE 10. That is, once the preamble is received in S220, the network (i.e. the Scell gNB, e.g. gNB 20 and/or gNB 30) transmits in S225 the CSI-RS for a period of time (indicated as time window), which can be set by the network operator in an appropriate manner. Hence, beginning with S225, the UE 10 can measure on the CSI-RS pattern of the Scell(s) being receivable. Transmission of the CSI-RS by the Scell is instructed, for example, by the Pcell gNB 20.

It is to be noted that the present example where the CSI-RS is sent when the RA preamble is received can be used if all devices are having same CSI-RS configuration configured/stored. On the other hand, if UE specific CSI-RS is used, the network (Scell gNB) should start transmitting the CSI-RS once the UE ID is known during the connection setup (this is the case, for example, when a response from the UE 10 is received, which will be described later).

As also described above, as one advantage of initiating the CSI-RS transmission on Scells once the network has received the RA preamble is that network has knowledge of the beam correspondence. That is, the network knows on which DL beam(s) the CSI-RS is to be transmitted, based on the DL beam used for PRACH signaling. It is to be noted that the same applies also when the CSI-RS is transmitted at a later point of time (as described below) during the PRACH procedure.

That is, due to the configuration information provided in S210, the UE 10 knows when it can expect the CSI-RS pattern to be present (i.e. during the time window shown in the figure) as soon as it has sent the preamble to the network.

In parallel to the procedure described above with regard to the CSI-RS measurement, the RA procedure with the Pcell is continued. That is, in S230, the gNB 20 sends the RAR to the UE 10 (i.e. Msg2 in the RA procedure).

In S235, the UE sends a connection request message (Msg3 in the RA procedure) to the gNB 20, which responds in S240 with a connection setup message (Msg4 in the RA procedure, which is also used as contention release message).

As described above, with Msg4, the security is established in the connection between the gNB 20 and the UE 10. Hence, from now on, the UE 10 can send a measurement report related to the CSI-RS signaling of S225 to the network (the Pcell gNB 20). In the example shown in FIG. 2, this is done in S245, where a connection setup complete message (Msg5 in the RA procedure) is sent to the gNB 20, which includes the measurement report. This report can now be processed on the Pcell controller side (the gNB 20) in order to configure the Scell setting.

In S250, a security mode command is sent to the UE 10, which responds in S255 with a security mode complete message and a RRC connection complete message.

In S260, based on the processing result of the measurement report received in S245, the Pcell gNB 20 sends Scell configuration information and an Scell addition indication to the UE 10. The Scell (e.g. Scell 1 or Scell 2) is assumed to be active at the configuration time. Furthermore, a corresponding RRC configuration setting is provided.

In S270, the connection to the Scell is established and data transmission is conducted.

Figure 3:
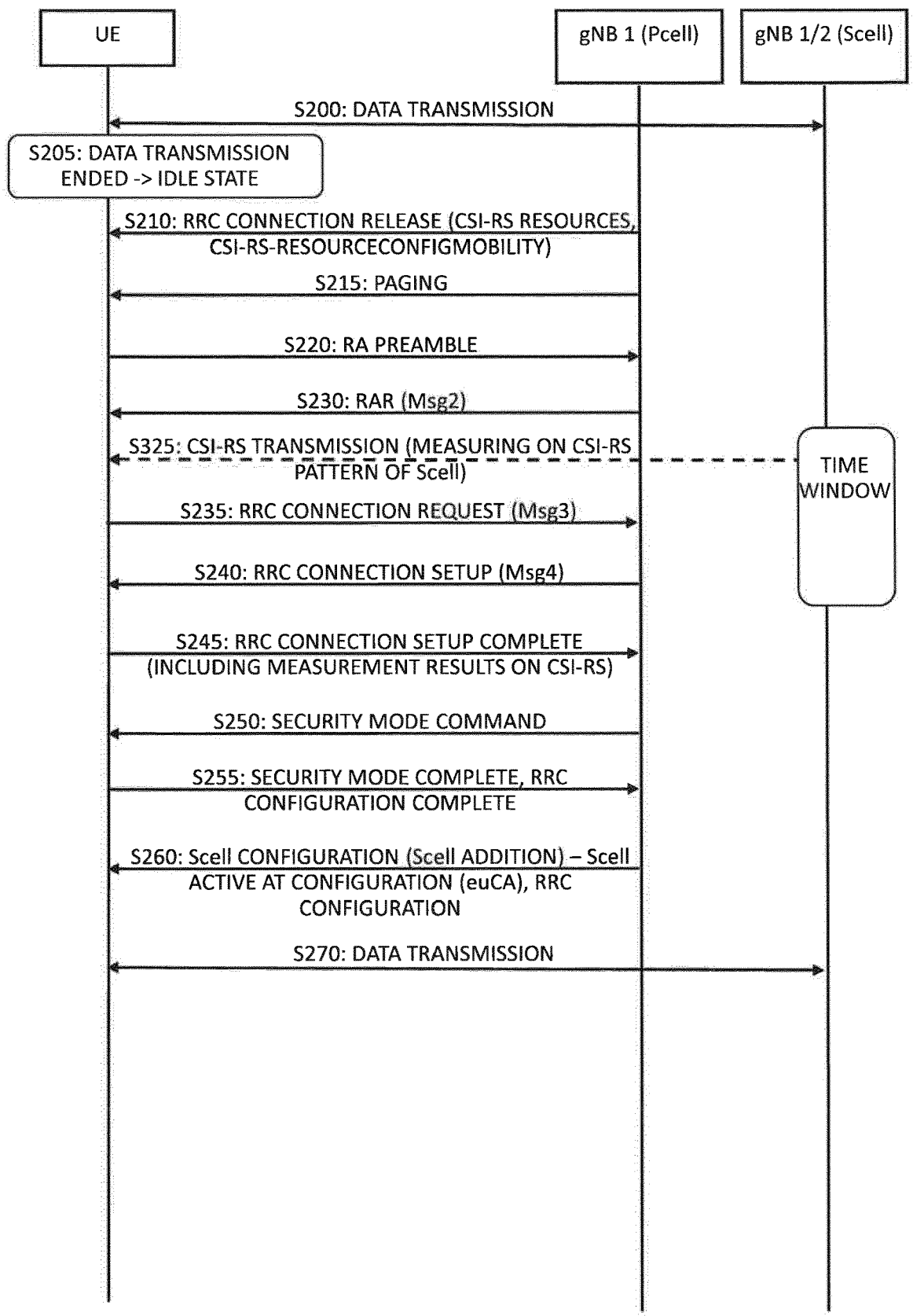
FIG. 3 shows a signaling diagram for explaining a connection establishment control procedure according to examples of embodiments.

FIG. 3 shows a signaling diagram for explaining a further example of a connection establishment control procedure according to examples of embodiments. It is to be noted that processing parts being equivalent to the connection establishment control procedure described in connection with FIG. 2 are indicated by using the same reference numbers, wherein a detailed description thereof is omitted. In the following, mainly the differences in the processing of the present example according to FIG. 3 are described in detail.

In the present example of embodiments, the timing when the transmission of the reference signal is initiated is different to that of the example described in connection with FIG. 2.

Specifically, the situation as described in FIG. 3 with regard to S200 (data transmission conducted between the UE 10 and the network), S205 (end of data transmission, UE 10 in idle state), S210 (connection release message including information for pre-configuring the UE 10 with a CSI-RS pattern), S215 (paging), and S220 (start of RA procedure by sending a RA preamble) is in correspondence with the example according to FIG. 2.

However, in contrast to the example of FIG. 2, in the present example, the CSI-RS transmission is not initiated after receiving the preamble. Rather, according to the present example, the Pcell gNB 20 sends now the RAR to the UE 10 (i.e. Msg2 in the RA procedure).

In the present example, CSI-RS transmission by the Scell is triggered when the RAR is sent to UE 10. That is, once the RAR is transmitted in S230, the network (i.e. the Scell gNB, e.g. gNB 20 and/or gNB 30) transmits in S325 the CSI-RS for a period of time (indicated as time window), which can be set by the network operator in an appropriate manner. Hence, beginning with S325, the UE 10 can measure on the CSI-RS pattern of the Scell(s) being receivable. Transmission of the CSI-RS by the Scell is instructed, for example, by the Pcell gNB 20.

Similar to the example according to FIG. 2, the present example where the CSI-RS is sent when the RAR is transmitted can be used if all devices are having same CSI-RS configuration configured/stored. Furthermore, as also described above, as one advantage of initiating the CSI-RS transmission on Scells once the network has received the RA preamble and transmitted the RAR is that network has knowledge of the beam correspondence. That is, the network knows on which DL beam(s) the CSI-RS is to be transmitted, based on the DL beam used for PRACH signaling. It is to be noted that the same applies also when the CSI-RS is transmitted at a later point of time (as described below) during the PRACH procedure.

That is, due to the configuration information provided in S210, the UE 10 knows when it can expect the CSI-RS pattern to be present (i.e. during the time window shown in the figure) as soon as it has received the RAR (Msg2) from the network.

The following processing, i.e. S235 (UE sends a connection request message (Msg3 in the RA procedure) to the gNB 20), S240 (connection setup message (Msg4 in the RA procedure, which is also used as contention release message), S245 (a connection setup complete message (Msg5 in the RA procedure) to the gNB 20 including the measurement report allowing Processing by the Pcell controller (the gNB 20) in order to configure the Scell setting) (or at a later point of time, since with Msg4, the security is established in the connection between the gNB 20 and the UE 10), S250 (security mode command to the UE 10), S255 (response by UE 10 with a security mode complete message and a RRC connection complete message), S260 (Pcell gNB 20 sends Scell configuration information and an Scell addition indication to the UE 10; Scell active at the configuration time;

corresponding RRC configuration), and S270 (connection to the Scell established, data transmission conducted) is comparable to that of FIG. 2.

Figure 4:
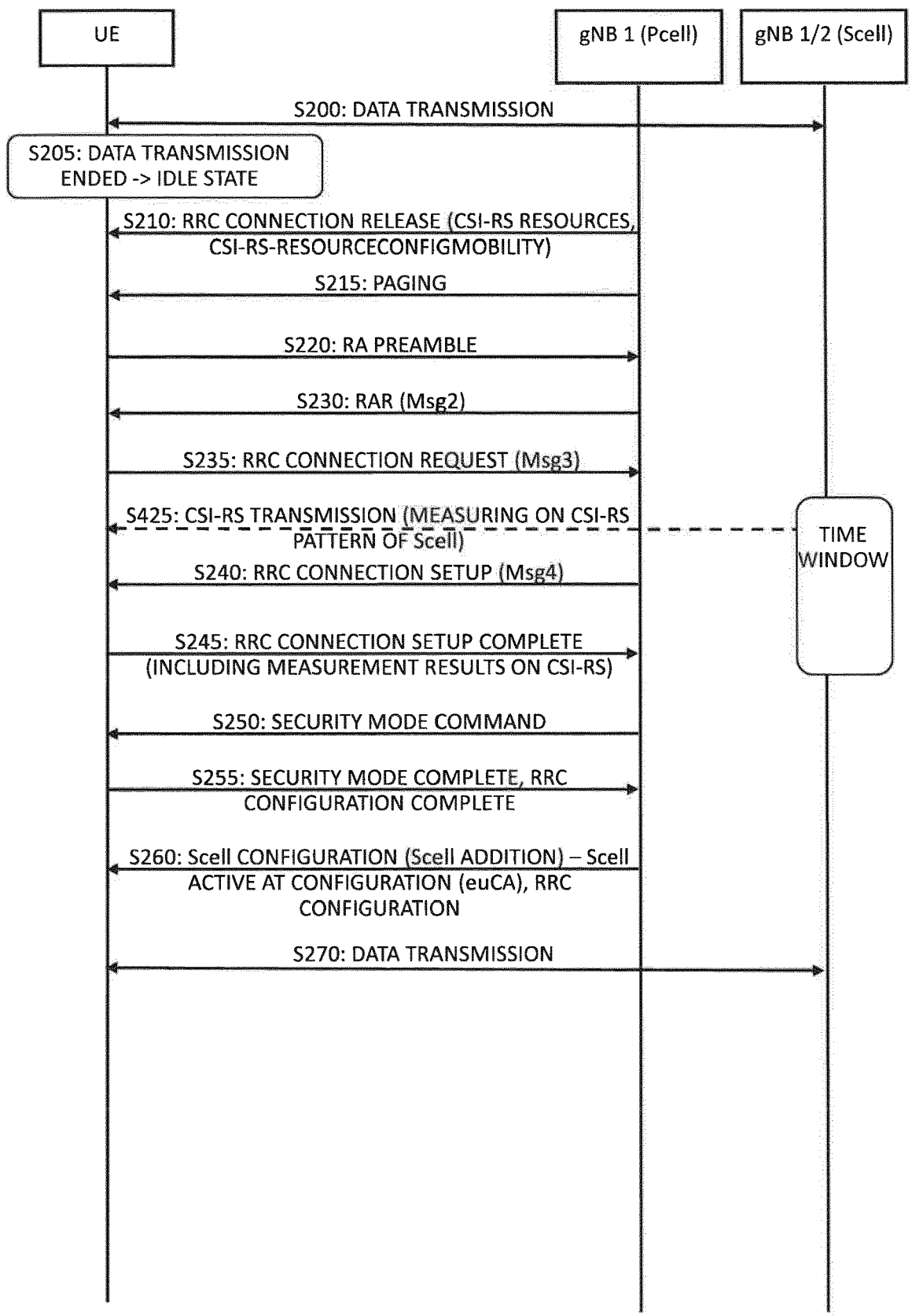
FIG. 4 shows a signaling diagram for explaining a connection establishment control procedure according to examples of embodiments.

FIG. 4 shows a signaling diagram for explaining a further example of a connection establishment control procedure according to examples of embodiments. It is to be noted that processing parts being equivalent to the connection establishment control procedure described in connection with FIG. 2 are indicated by using the same reference numbers, wherein a detailed description thereof is omitted. In the following, mainly the differences in the processing of the present example according to FIG. 4 are described in detail.

In the present example of embodiments, the timing when the transmission of the reference signal is initiated is different to that of the example described in connection with FIG. 2 or FIG. 3.

Specifically, the situation as described in FIG. 4 with regard to S200 (data transmission conducted between the UE 10 and the network), S205 (end of data transmission, UE 10 in idle state), S210 (connection release message including information for pre-configuring the UE 10 with a CSI-RS pattern), S215 (paging), and S220 (start of RA procedure by sending a RA preamble) is in correspondence with the example according to FIG. 2.

However, in contrast to the example of FIG. 2, in the present example, the CSI-RS transmission is not initiated after receiving the preamble. Rather, according to the present example, the Pcell gNB 20 sends now the RAR to the UE 10 (i.e. Msg2 in the RA procedure). Furthermore, the UE 10 responds in S235 with a connection request message (Msg3 in the RA procedure) to the gNB 20.

In the present example, CSI-RS transmission by the Scell is triggered when the connection request message (Msg3) from the UE 10 is received by the gNB 20. That is, once the Msg3 received by the gNB 20 in S235, the network (i.e. the Scell gNB, e.g. gNB 20 and/or gNB 30) transmits in S425 the CSI-RS for a period of time (indicated as time window), which can be set by the network operator in an appropriate manner. Hence, beginning with S425, the UE 10 can measure on the CSI-RS pattern of the Scell(s) being receivable. Transmission of the CSI-RS by the Scell is instructed, for example, by the Pcell gNB 20.

In the example according to FIG. 4, the CSI-RS is sent when the connection setup request (Msg3) is received. That is, the UE ID is known. This approach is used, for example, in case UE specific CSI-RS is used. Furthermore, as also described above, as one advantage of initiating the CSI-RS transmission on Scells once the network has received the RA preamble is that network has knowledge of the beam correspondence. That is, the network knows on which DL beam(s) the CSI-RS is to be transmitted, based on the DL beam used for PRACH signaling. It is to be noted that the same applies also when the CSI-RS is transmitted at a later point of time (as described below) during the PRACH procedure.

Due to the configuration information provided in S210, the UE 10 knows when it can expect the CSI-RS pattern to be present (i.e. during the time window shown in the figure) as soon as it has transmitted the connection setup message (Msg3) to the network.

The following processing, i.e. S240 (connection setup message (Msg4 in the RA procedure, which is also used as contention release message), S245 (a connection setup complete message (Msg5 in the RA procedure) to the gNB 20 including the measurement report allowing Processing by the Pcell controller (the gNB 20) in order to configure the Scell setting) (or at a later point of time, since with Msg4, the security is established in the connection between the gNB 20 and the UE 10), S250 (security mode command to the UE 10), S255 (response by UE 10 with a security mode complete message and a RRC connection complete message), S260 (Pcell gNB 20 sends Scell configuration information and an Scell addition indication to the UE 10; Scell active at the configuration time; corresponding RRC configuration), and S270 (connection to the Scell established, data transmission conducted) is comparable to that of FIG. 2.

Figure 5:
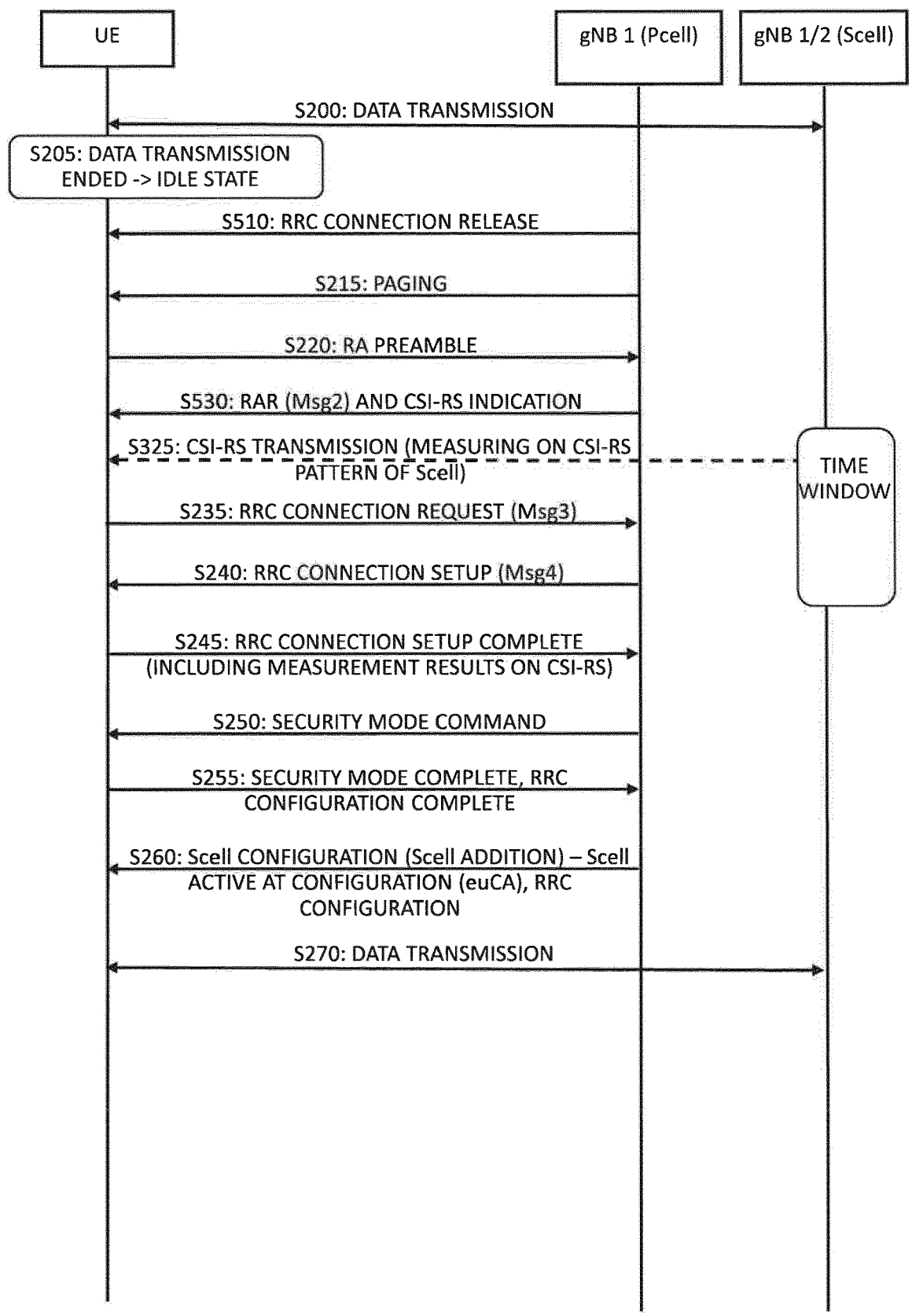
FIG. 5 shows a signaling diagram for explaining a connection establishment control procedure according to examples of embodiments.

FIG. 5 shows a signaling diagram for explaining a further example of a connection establishment control procedure according to examples of embodiments. It is to be noted that processing parts being equivalent to the connection establishment control procedure described in connection with FIG. 2 are indicated by using the same reference numbers, wherein a detailed description thereof is omitted. In the following, mainly the differences in the processing of the present example according to FIG. 5 are described in detail.

In the present example of embodiments, the manner in which the reference signal pattern is provided to the UE 10 is different to that of the example described in connection with FIG. 2 to FIG. 4.

At first, the situation as described in FIG. 5 with regard to S200 (data transmission conducted between the UE 10 and the network) and S205 (end of data transmission, UE 10 in idle state) is in correspondence with the example according to FIG. 2.

However, in contrast to the example of FIG. 2, in the present example, when a connection release message is sent from the network to the UE 10, information for pre-configuring the UE 10 with a CSI-RS pattern is not included therein.

The following processing according to S215 (paging) and S220 (start of RA procedure by sending a RA preamble) is again in correspondence with that of FIG. 2.

Now, in S530, when transmitting the RAR to the UE 10 (i.e. Msg2 in the RA procedure), the Pcell gNB 20 provides a CSI-RS indication to the UE 10 for indicating the resources to be listened for the RS measurement.

Next, according to the present example, CSI-RS transmission by the Scell is triggered when the RAR (with the CSI-RS indication) is sent to UE 10. That is, once the RAR and the CSI-RS indication are transmitted in S530, the network (i.e. the Scell gNB, e.g. gNB 20 and/or gNB 30) transmits in S325 the CSI-RS for a period of time (indicated as time window), which can be set by the network operator in an appropriate manner. Hence, beginning with S325, the UE 10 can measure on the CSI-RS pattern of the Scell(s) being receivable. Transmission of the CSI-RS by the Scell is instructed, for example, by the Pcell gNB 20.

The UE 10 responds in S235 with a connection request message (Msg3 in the RA procedure) to the gNB 20. Due to the configuration information provided in S510, the UE 10 knows when it can expect the CSI-RS pattern to be present (i.e. during the time window shown in the figure).

It is to be noted that in the example shown in FIG. 5 the timing when the transmission of the reference signal (CSI-RS) is initiated is in correspondence to that according to the example of FIG. 3 (i.e. after transmission of the RAR). However, the timing of initiating the transmission of the CSI-RS can be also in accordance with that of FIG. 4, i.e. after the Msg3 (connection setup) is received from the UE 10 in S235.

The following processing, i.e. S240 (connection setup message (Msg4 in the RA procedure, which is also used as contention release message), S245 (a connection setup complete message (Msg5 in the RA procedure) to the gNB 20 including the measurement report allowing Processing by the Pcell controller (the gNB 20) in order to configure the Scell setting) (or at a later point of time, since with Msg4, the security is established in the connection between the gNB 20 and the UE 10), S250 (security mode command to the UE 10), S255 (response by UE 10 with a security mode complete message and a RRC connection complete message), S260 (Pcell gNB 20 sends Scell configuration information and an Scell addition indication to the UE 10; Scell active at the configuration time; corresponding RRC configuration), and S270 (connection to the Scell established, data transmission conducted) is comparable to that of FIG. 2.

As a further modification, the preparation of the UE 10 for listening to the CSI-RS can be made in another manner compared to that of FIGS. 2 to 5. Specifically, the UE 10 can be configured to store information related to the reference signals used in the connected mode (i.e. in S200), which is then used for listening to the a corresponding CSI-RS. Other processing parts, such as beam correspondence determination, can be similar to that described above.

Figure 6:
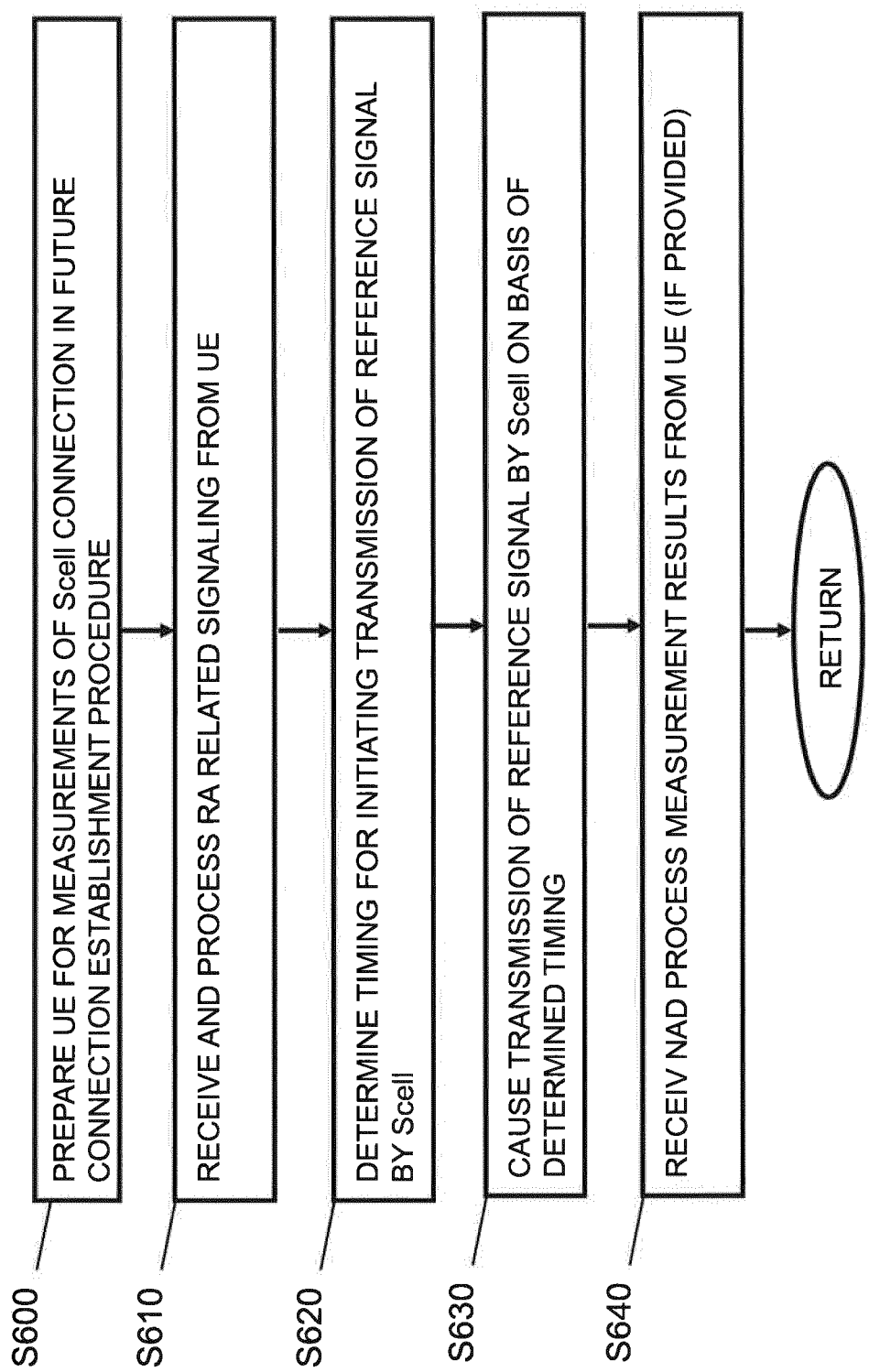
FIG. 6 shows a flow chart of a processing executed by a communication network control element or function according to some examples of embodiments.

FIG. 6 shows a flow chart of a processing executed by a communication network control element or function according to some examples of embodiments, which conducts a connection establishment control for a communication element or function (UE) in a communication network. According to some examples of embodiments, the communication connection comprises a primary connection (with Pcell) and a secondary connection (with Scell) wherein a dual connectivity mode communication or carrier aggregation mode communication of the communication element or function is to be configured.

In S600, the communication element or function (e.g. UE 10) is prepared to conduct measurements for establishing a secondary connection (with the Scell) during a random access procedure conducted for establishing a primary connection (with the Pcell). The measurements for establishing the secondary connection are to be based on a reference signal, such as the CSI-RS, to be transmitted by at least one secondary communication network control element or function (i.e. the Scell controller) enabling the establishment of the secondary connection.

According to some examples of embodiments, the preparation of the communication element or function is related to conduct the measurements for establishing the secondary connection during the random access procedure conducted for establishing a primary connection in future. This is achieved by providing an indication (or instruction) to store, in the communication element or function, data of configured reference signals (CSI-RS) used during a connected state of the communication element or function (i.e. in the previous communication connection phase).

Alternatively or additionally, configuration data of at least one reference signal of at least one secondary communication network control element or function (e.g. gNB 20 or gNB 30) enabling the establishment of the secondary connection are provided. The configuration data indicates at least one of communication resources to be listened by the communication element or function for receiving the reference signal and timing information regarding a reception of the reference signal. For example, according to some examples of embodiments, the configuration data are transmitted with a connection release message to the communication element or function in a communication connection existing before the establishment of the primary connection in future (i.e. in the previous communication connection).

Otherwise, according to some examples of embodiments, the communication element or function is prepared to conduct the measurements for establishing the secondary connection during the random access procedure conducted for establishing a current primary connection (i.e. the RA procedure with the Pcell is already going on). For this, an indication of at least one reference signal is provided to the UE in a random access related signaling.

In S610, a random access related signaling is received and processed from the communication element or function regarding the primary connection. That is, the RA procedure for the primary connection (Pcell) is conducted.

In S620, a timing for initiating a transmission of the reference signal by the at least one secondary communication network control element or function (Scell controller) is determined.

According to some examples of embodiments, the timing for initiating the transmission of the reference signal by the at least one secondary communication network control element or function comprises to initiate the transmission of the reference signal by the at least one secondary communication network control element or function after receiving a preamble in the random access related signaling from the communication element or function (see e.g. FIG. 2). Otherwise, the timing for initiating the transmission of the reference signal by the at least one secondary communication network control element or function comprises to initiate the transmission of the reference signal by the at least one secondary communication network control element or function after transmitting, to the communication element or function, a random access response message in reply to a random access preamble in the random access related signaling from the communication element or function (see e.g. FIG. 3). Moreover, as an alternative, the timing for initiating the transmission of the reference signal by the at least one secondary communication network control element or function comprises to initiate the transmission of the reference signal by the at least one secondary communication network control element or function after receiving a connection request message from the communication element or function (see e.g. FIG. 4).

According to some examples of embodiments, when determining the timing for initiating the transmission of the reference signal by the at least one secondary communication network control element or function, a period of time (time window) is set during which the reference signal is to be transmitted by the at least one secondary communication network control element or function (e.g. during the RA procedure for the primary connection or even longer than this).

In S630, the transmission of the reference signal by the at least one secondary communication network control element or function on the basis of the determined timing is caused (e.g. by triggering the Scell controller accordingly).

According to examples of embodiments, besides the determination of the timing of the transmission of the reference signal, also a beam correspondence for a transmission of the reference signal by the at least one secondary communication network control element or function is determined, for example, on the basis of a beam used for communicating a random access related signaling. In this case, the transmission of the reference signal by the at least one secondary communication network control element or function is also caused on the basis of the determined beam correspondence.

In S640, e.g. still during the RA procedure conducted for establishing the primary connection, measurement results regarding the secondary connection (i.e. with Scell) are received from the communication element or function and processed. This transmission of the measurement results is done after completion of security setting for the communication connection between the communication element or function and the communication network control element or function in the random access procedure (e.g. after Msg4).

According to some examples of embodiments, the processing described above is implemented in a communication network control element or function acting as the communication network control element or function for the primary connection and as the secondary communication network control element or function (e.g. gNB 20 of FIG. 1). Alternatively, in case the processing is implemented in a communication network control element or function acting as the communication network control element or function for only the primary connection while the secondary communication network control element or function is located in a different site (e.g. in gNB 30) being controlled by the communication network control element or function for the primary connection (as master node), a transmission of the reference signal by the at least one secondary communication network control element or function is caused by sending an instruction to the at least one secondary communication network control element or function (e.g. via X2).

Figure 7:
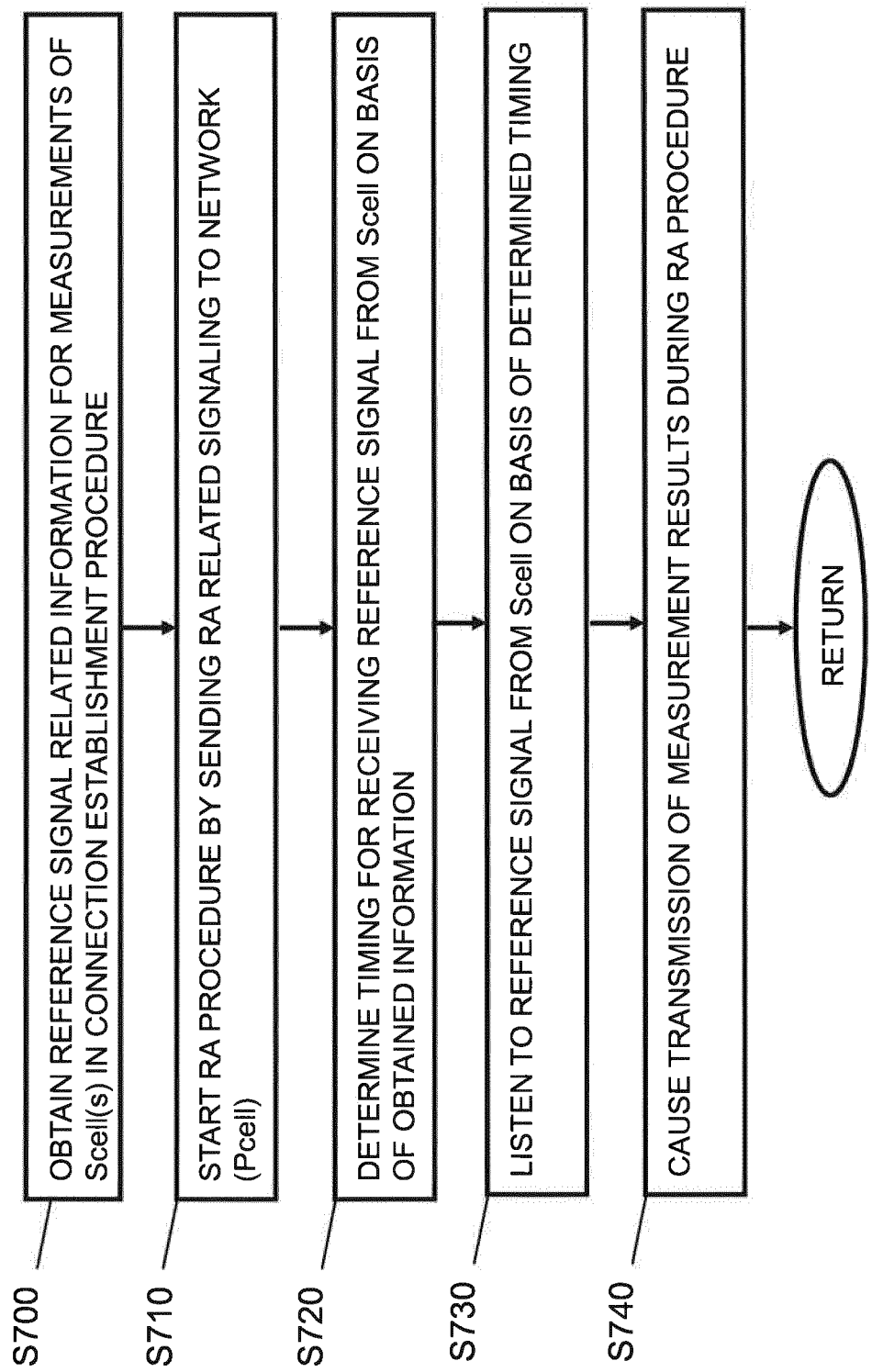
FIG. 7 shows a flow chart of a processing executed by a communication element or function such as a UE according to some examples of embodiments.

FIG. 7 shows a flow chart of a processing executed by a communication element or function according to some examples of embodiments, which conducts a connection establishment control in a communication network. According to some examples of embodiments, the communication connection comprises a primary connection (with Pcell) and a secondary connection (with Scell) wherein a dual connectivity mode communication or carrier aggregation mode communication of the communication element or function is to be configured.

In S700, information for conducting measurements for establishing a secondary connection (with the Scell) during a random access procedure conducted for establishing a primary connection (with the Pcell) is obtained. The measurements for establishing the secondary connection are to be based on a reference signal (e.g. CSI-RS) to be transmitted by at least one secondary communication network control element or function (i.e. the Scell controller) enabling the establishment of the secondary connection, According to some examples of embodiments, the information is obtained for conducting the measurements for establishing the secondary connection during the random access procedure conducted for establishing a primary connection in future. This is done, for example, by storing data of configured reference signals used during a connected state of the communication element or function (i.e. in the previous communication connection phase).

Alternatively or additionally, configuration data are received from the communication network control element or function (of the Pcell) indicating at least one reference signal of at least one secondary communication network control element or function (e.g. gNB 20 or gNB 30) enabling the establishment of the secondary connection. The configuration data indicate at least one of communication resources to be listened by the communication element or function for receiving the reference signal and timing information regarding a reception of the reference signal. For example, the configuration data are received with a connection release message from the communication network control element or function in a communication connection existing before the establishment of the primary connection in future (i.e. in the previous communication connection).

Alternatively, the information for conducting the measurements for establishing the secondary connection (with the Scell) is obtained during the RA procedure conducted for establishing a current primary connection (i.e. the RA procedure with the Pcell is already going on). For this, an indication of at least one reference signal in a random access related signaling is received (see e.g. FIG. 5).

In S710, a RA procedure for establishing the primary connection with the communication network control element or function (Pcell controller) is started by sending a random access related signaling (e.g. RA preamble) to the communication network control element or function.

In S720, a timing for receiving (i.e. listening to) the reference signal sent by the at least one secondary communication network control element or function (Scell controller) is determined.

According to some examples of embodiments, the timing for receiving the reference signal from the at least one secondary communication network control element or function comprises to listen to the reference signal transmission from the at least one secondary communication network control element or function after a preamble in the RA related signaling is sent to the communication network control element or function (see e.g. FIG. 2). Otherwise, the timing for receiving the reference signal from the at least one secondary communication network control element or function comprises to listen to the reference signal transmission from the at least one secondary communication network control element or function after receiving, from the communication network control element or function, a random access response message in reply to a random access preamble in the random access related signaling (see e.g. FIG. 3). Moreover, as an alternative, the timing for receiving the reference signal from the at least one secondary communication network control element or function comprises to listen to the reference signal transmission from the at least one secondary communication network control element or function after transmitting a connection request message to the communication network control element or function (see e.g. FIG. 4).

According to some examples of embodiments, when determining the timing for receiving the reference signal from the at least one secondary communication network control element or function, a period of time (time window) is set during which the reference signal is to be transmitted by the at least one secondary communication network control element or function (e.g. during the RA procedure for the primary connection or even longer than this).

In S730, the UE 10 listens to the reference signal (CSI-RS) transmitted by the at least one secondary communication network control element or function on the basis of the determined timing.

According to examples of embodiments, besides the determination of the timing for receiving the reference signal, also a beam correspondence for a transmission of the reference signal by the at least one secondary communication network control element or function is determined, for example, on the basis of a beam used for communicating a random access related signaling. In this case, the reference signal transmission by the at least one secondary communication network control element or function is listened to under consideration of the determined beam correspondence.

In S740, during the RA procedure conducted for establishing the primary connection (with Pcell), measurement results regarding the secondary connection are transmitted to the communication network control element or function. This transmission of the measurement results is done after completion of security setting for the communication connection between the communication element or function and the communication network control element or function in the random access procedure (e.g. after Msg4).

According to some examples of embodiments, the communication network control element or function acts as the communication network control element or function for the primary connection and as the secondary communication network control element or function (e.g. gNB 20 of FIG. 1). Alternatively, the communication network control element or function acts as the communication network control element or function for the primary connection (i.e. the gNB 20) and the secondary communication network control element or function is located in a different site (e.g. in the gNB 30) and controlled by the communication network control element or function for the primary connection (e.g. via X2).

Figure 8:
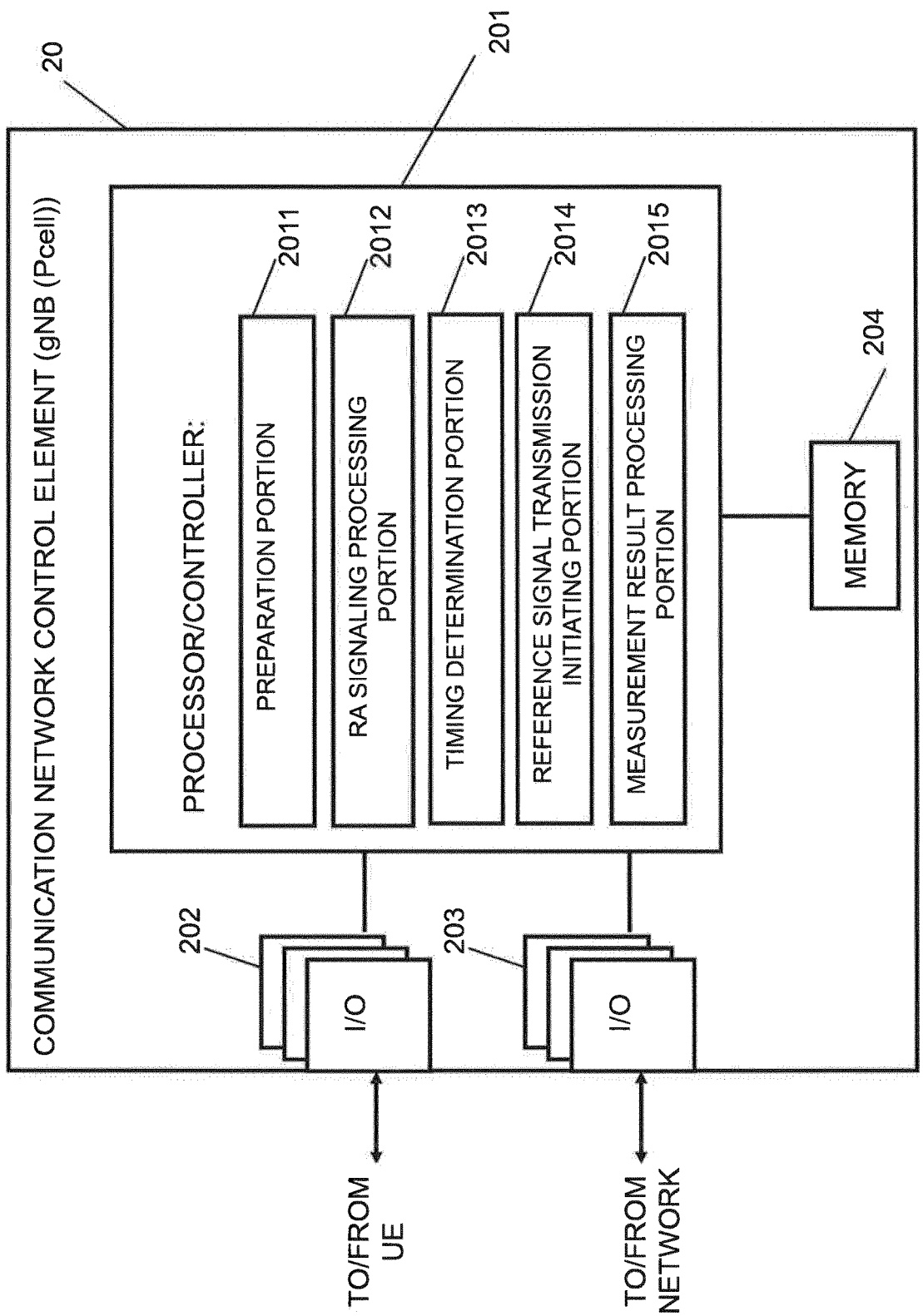
FIG. 8 shows a diagram of a network element or function representing a communication network control element or function according to some examples of embodiments.

FIG. 8 shows a diagram of a network element or function representing a communication network control element or function according to some examples of embodiments, e.g. a Pcell controller like the gNB 20 of FIG. 1, which is configured to conduct a communication establishment control procedure as described in connection with some of the examples of embodiments. It is to be noted that the communication network control element or function, like the gNB 20 of FIG. 1, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element or function shown in FIG. 8 may include a processing circuitry, a processing function, a control unit or a processor 201, such as a CPU or the like, which is suitable for executing instructions given by programs or the like related to the control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with a communication element or function like the UE 10, as described in connection with FIG. 1, for example. The I/O units 203 may be used for communicating with other network element, like another communication network control element or function (e.g. X2 interface of FIG. 1) or the core network. The I/O units 202 and 203 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described communication establishment control processing. In particular, the processor or processing circuitry or function 201 includes one or more of the following sub-portions. Sub-portion 2011 is a processing portion which is usable as a portion for a preparation processing. The portion 2011 may be configured to perform processing according to S600 of FIG. 6. Furthermore, the processor or processing circuitry or function 201 may include a sub-portion 2012 usable as a portion for conducting a random access processing. The portion 2012 may be configured to perform a processing according to S610 of FIG. 6. In addition, the processor or processing circuitry or function 201 may include a sub-portion 2013 usable as a portion for determining a reference signal transmission timing. The portion 2013 may be configured to perform a processing according to S620 of FIG. 6. Moreover, the processor or processing circuitry or function 201 may include a sub-portion 2014 usable as a portion for initiating a reference signal transmission. The portion 2014 may be configured to perform a processing according to S630 of FIG. 6. Furthermore, the processor or processing circuitry or function 201 may include a sub-portion 2015 usable as a portion for processing a measurement result. The portion 2015 may be configured to perform a processing according to S640 of FIG. 6.

Figure 9:
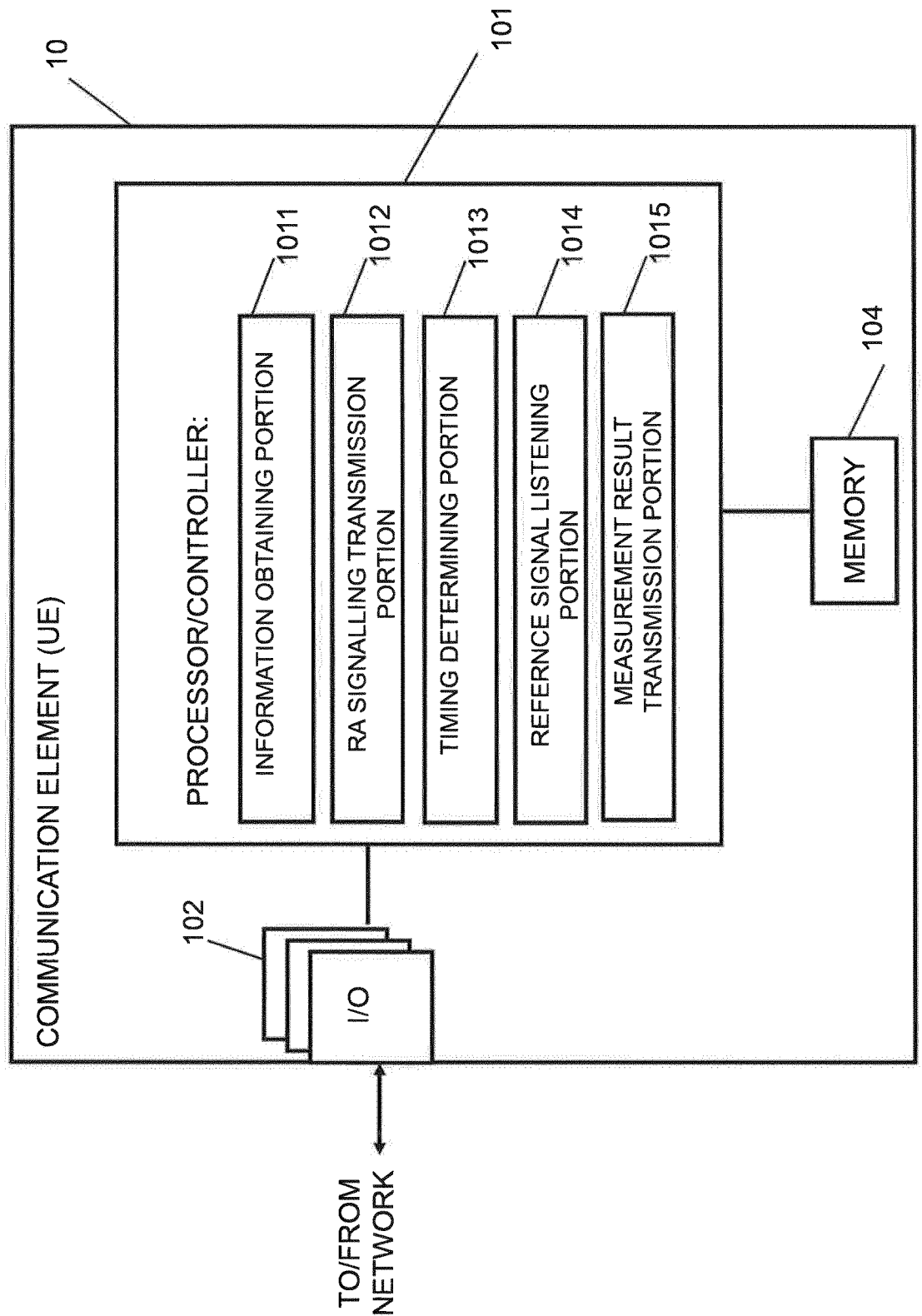
FIG. 9 shows a diagram of a network element or function representing a communication element or function according to some examples of embodiments.

FIG. 9 shows a diagram of a network element or function representing a communication element or function according to some examples of embodiments, e.g. a UE 10 of FIG. 1, which is configured to conduct a communication establishment control procedure as described in connection with some of the examples of embodiments. It is to be noted that the communication element or function, like the UE 10 of FIG. 1, may include further elements or functions besides those described herein below. Furthermore, even though reference is made to a communication element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication element or function shown in FIG. 9 may include a processing circuitry, a processing function, a control unit or a processor 101, such as a CPU or the like, which is suitable for executing instructions given by programs or the like related to the control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 102 denotes input/output (I/O) units or functions (interfaces) connected to the processor or processing function 101. The I/O units 102 may be used for communicating with a communication network control element or function like the gNB 20, as described in connection with FIG. 1, for example. The I/O units 102 may be a combined unit including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described communication establishment control processing. In particular, the processor or processing circuitry or function 101 includes one or more of the following sub-portions. Sub-portion 1011 is a processing portion which is usable as a portion for obtaining information. The portion 1011 may be configured to perform processing according to S700 of FIG. 7. Furthermore, the processor or processing circuitry or function 101 may include a sub-portion 1012 usable as a portion for transmitting a RA related signaling. The portion 1012 may be configured to perform a processing according to S710 of FIG. 7. In addition, the processor or processing circuitry or function 101 may include a sub-portion 1013 usable as a portion for determining a timing for receiving a reference signal. The portion 1013 may be configured to perform a processing according to S720 of FIG. 7. Moreover, the processor or processing circuitry or function 101 may include a sub-portion 1014 usable as a portion for listening to a reference signal. The portion 1014 may be configured to perform a processing according to S730 of FIG. 7. In addition, the processor or processing circuitry or function 101 may include a sub-portion 1015 usable as a portion for transmitting a measurement result. The portion 1015 may be configured to perform a processing according to S740 of FIG. 7.

It is to be noted that examples of embodiments of the invention are applicable to various different network configurations. In other words, the examples shown in the above described figures, which are used as a basis for the above discussed examples, are only illustrative and do not limit the present invention in any way. That is, additional further existing and proposed new functionalities available in a corresponding operating environment may be used in connection with examples of embodiments of the invention based on the principles defined.

For example, the way to prepare the UE for conducting the measurements for Scell (by using a reference signal like CSI-RS), which is described to be either by provision of configuration data at the end of a previous connection, by storing the CSI-RS used in a previous connection, or by providing the indication of the CSI-RS during the RA procedure related to the Pcell, can be combined with each other so that two or all three ways are used. Furthermore, each of the above described way for preparing the UE can be combined with any timing setting for the transmission of the reference signal by the Scell.

According to a further example of embodiments, there is provided, for example, an apparatus for use by a communication network control element or function configured to conduct a communication control for a communication with a communication element or function in a communication network, the apparatus comprising means configured to prepare the communication element or function to conduct measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection, means configured to receive and process a random access related signaling from the communication element or function regarding the primary connection, means configured to determine a timing for initiating a transmission of the reference signal by the at least one secondary communication network control element or function, and means configured to cause transmission of the reference signal by the at least one secondary communication network control element or function on the basis of the determined timing.

Furthermore, according to some other examples of embodiments, the above defined apparatus may further comprise means for conducting at least one of the processing defined in the above described methods, for example a method according to that described in connection with FIG. 6.

According to a further example of embodiments, there is provided, for example, an apparatus for use by a communication element or function configured to conduct a communication in a communication network under control of a communication network control element or function, the apparatus comprising means configured to obtain information for conducting measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection, means configured to start a random access procedure for establishing the primary connection with the communication network control element or function by sending a random access related signaling to the communication network control element or function, means configured to determine a timing for receiving the reference signal from the at least one secondary communication network control element or function on the basis of the obtained information, and means configured to listen to the reference signal transmitted by the at least one secondary communication network control element or function on the basis of the determined timing.

Furthermore, according to some other examples of embodiments, the above defined apparatus may further comprise means for conducting at least one of the processing defined in the above described methods, for example a method according to that described in connection with FIG. 7.

According to a further example of embodiments, there is provided, for example, a non-transitory computer readable medium comprising program instructions for causing an apparatus to perform, when conducting a communication control for a communication with a communication element or function in a communication network, at least the following: preparing the communication element or function to conduct measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection, receiving and processing a random access related signaling from the communication element or function regarding the primary connection, determining a timing for initiating a transmission of the reference signal by the at least one secondary communication network control element or function, and causing transmission of the reference signal by the at least one secondary communication network control element or function on the basis of the determined timing.

According to a further example of embodiments, there is provided, for example, a non-transitory computer readable medium comprising program instructions for causing an apparatus to perform, when conducting a communication in a communication network under control of a communication network control element or function, at least the following: obtaining information for conducting measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection, starting a random access procedure for establishing the primary connection with the communication network control element or function by sending a random access related signaling to the communication network control element or function, determining a timing for receiving the reference signal from the at least one secondary communication network control element or function on the basis of the obtained information, and listening to the reference signal transmitted by the at least one secondary communication network control element or function on the basis of the determined timing.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus for use by a communication network control element or function configured to conduct a communication control for a communication with a communication element or function in a communication network, the apparatus comprising
at least one processing circuitry; and
at least one memory storing instructions to be executed by the processing circuitry;
wherein the at least one memory and the instructions are configured to, with the at least one processing circuitry, cause the apparatus at least to:
prepare the communication element or function to conduct measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection,
receive and process a random access related signaling from the communication element or function regarding the primary connection,
determine a timing for initiating a transmission of the reference signal by the at least one secondary communication network control element or function, and
cause transmission of the reference signal by the at least one secondary communication network control element or function on the basis of the determined timing.

2. The apparatus according to claim 1, wherein the at least one memory and the instructions are further configured to, with the at least one processing circuitry, cause the apparatus at least to:
prepare the communication element or function to conduct the measurements for establishing the secondary connection during the random access procedure conducted for establishing a primary connection in future by providing at least one of
an indication to store, in the communication element or function, data of configured reference signals used during a connected state of the communication element or function, and
configuration data of at least one reference signal of at least one secondary communication network control element or function enabling the establishment of the secondary connection, the configuration data indicating at least one of communication resources to be listened by the communication element or function for receiving the reference signal and timing information regarding a reception of the reference signal, or
prepare the communication element or function to conduct the measurements for establishing the secondary connection during the random access procedure conducted for establishing a current primary connection by providing an indication of at least one reference signal in a random access related signaling.

3. The apparatus according to claim wherein the at least one memory and the instructions are further configured to, with the at least one processing circuitry, cause the apparatus at least to:
cause a transmission of the configuration data with a connection release message to the communication element or function in a communication connection existing before the establishment of the primary connection in future.

4. The apparatus according to claim 3, wherein a timing for initiating the transmission of the reference signal by the at least one secondary communication network control element or function comprises one of
initiating the transmission of the reference signal by the at least one secondary communication network control element or function after receiving a preamble in the random access related signaling from the communication element or function, initiating the transmission of the reference signal by the at least one secondary communication network control element or function after transmitting, to the communication element or function, a random access response message in reply to a random access preamble in the random access related signaling from the communication element or function, and
initiating the transmission of the reference signal by the at least one secondary communication network control element or function after receiving a connection request message from the communication element or function.

5. The apparatus according to claim 4, wherein determining of the timing for initiating the transmission of the reference signal by the at least one secondary communication network control element or function comprises
setting a period of time during which the reference signal is to be transmitted by the at least one secondary communication network control element or function.

6. The apparatus according to claim 5, wherein the at least one memory and the instructions are further configured to, with the at least one processing circuitry, cause the apparatus at least to:
determine a beam correspondence for a transmission of the reference signal by the at least one secondary communication network control element or function on the basis of a beam used for communicating a random access related signaling, and
cause transmission of the reference signal by the at least one secondary communication network control element or function on the basis of the determined beam correspondence.

7. The apparatus according to claim 6, wherein the at least one memory and the instructions are further configured to, with the at least one processing circuitry, cause the apparatus at least to:
receive and process, during the random access procedure conducted for establishing the primary connection, measurement results regarding the secondary connection from the communication element or function after completion of security setting for the communication connection between the communication element or function and the communication network control element or function in the random access procedure.

8. The apparatus according to claim 7, wherein the secondary connection is configured to be established in a dual connectivity mode communication or carrier aggregation mode communication of the communication element or function.

9. The apparatus according to claim 8, wherein the reference signal to be transmitted by the at least one secondary communication network control element or function is a channel state information reference signal.

10. The apparatus according to claim 9, wherein the apparatus is implemented in a communication network control element or function acting as the communication network control element or function for the primary connection and as the secondary communication network control element or function.

11. An apparatus for use by a communication element or function configured to conduct a communication in a communication network under control of a communication network control element or function, the apparatus comprising
at least one processing circuitry; and
at least one memory for storing instructions to be executed by the processing circuitry;
wherein the at least one memory and the instructions are configured to, with the at least one processing circuitry, cause the apparatus at least to:
obtain information for conducting measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection,
start a random access procedure for establishing the primary connection with the communication network control element or function by sending a random access related signaling to the communication network control element or function,
determine a timing for receiving the reference signal from the at least one secondary communication network control element or function on the basis of the obtained information, and
listen to the reference signal transmitted by the at least one secondary communication network control element or function on based upon the determined timing.

12. The apparatus according to claim 11, wherein the at least one memory and the instructions are further configured to, with the at least one processing circuitry, cause the apparatus at least to:
obtain the information for conducting the measurements for establishing the secondary connection during the random access procedure conducted for establishing a primary connection in future by one of
storing data of configured reference signals used during a connected state of the communication element or function, and
receiving and processing configuration data from the communication network control element or function indicating at least one reference signal of at least one secondary communication network control element or function enabling the establishment of the secondary connection, the configuration data indicating at least one of communication resources to be listened by the communication element or function for receiving the reference signal and timing information regarding a reception of the reference signal, or
obtain the information for conducting the measurements for establishing the secondary connection during the random access procedure conducted for establishing a current primary connection by receiving an indication of at least one reference signal in a random access related signaling.

13. The apparatus according to claim 12, wherein the at least one memory and the instructions are further configured to, with the at least one processing circuitry, cause the apparatus at least to:
receive the configuration data with a connection release message from the communication network control element or function in a communication connection existing before the establishment of the primary connection in future.

14. The apparatus according to claim 13, wherein the timing for receiving the reference signal from the at least one secondary communication network control element or function comprises one of
starting to listen to the reference signal from the at least one secondary communication network control element or function after transmitting a preamble in the random access related signaling to the communication network control element or function,
starting to listen to the reference signal from the at least one secondary communication network control element or function after receiving from the communication network control element or function a random access response message in reply to a random access preamble in the random access related signaling, and
starting to listen to the reference signal from the at least one secondary communication network control element or function after transmitting a connection request message to the communication network control element or function.

15. The apparatus according to claim 14, wherein determining of the timing for receiving the reference signal from the at least one secondary communication network control element or function comprises
setting a period of time during which the reference signal is to be transmitted by the at least one secondary communication network control element or function.

16. The apparatus according to claim 15, wherein the at least one memory and the instructions are further configured to, with the at least one processing circuitry, cause the apparatus at least to:
determine a beam via which the reference signal from the at least one secondary communication network control element or function is received on the basis of a beam used for communicating a random access related signaling, and
listen to the reference signal from the at least one secondary communication network control element or function on the basis of the determined beam.

17. The apparatus according to claim 16, wherein the at least one memory and the instructions are further configured to, with the at least one processing circuitry, cause the apparatus at least to:
cause, during the random access procedure conducted for establishing the primary connection, transmission of measurement results regarding the secondary connection to the communication network control element or function after completion of security setting for the communication connection between the communication element or function and the communication network control element or function in the random access procedure.

18. The apparatus according to claim 17, wherein the secondary connection is configured to be established in a dual connectivity mode communication or carrier aggregation mode communication of the communication element or function.

19. The apparatus according to claim 18, wherein the reference signal to be received from the at least one secondary communication network control element or function is a channel state information reference signal.

20. A method for use in a communication network control element or function configured to conduct a communication control for a communication with a communication element or function in a communication network, the method comprising:

preparing the communication element or function to conduct measurements for establishing a secondary connection during a random access procedure conducted for establishing a primary connection, wherein the measurements for establishing the secondary connection are to be based on a reference signal to be transmitted by at least one secondary communication network control element or function enabling the establishment of the secondary connection;

receiving and processing a random access related signaling from the communication element or function regarding the primary connection;

determining a timing for initiating a transmission of the reference signal by the at least one secondary communication network control element or function; and causing transmission of the reference signal by the at least one secondary communication network control element or function on the basis of the determined timing.

* * * * *